(12) United States Patent
Nethery

(10) Patent No.: US 7,914,033 B2
(45) Date of Patent: Mar. 29, 2011

(54) METHOD AND APPARATUS FOR STABILIZING A MOTORCYCLE

(76) Inventor: Carl Rae Nethery, Hebron, IN (US)

(*) Notice: Subject to any disclaimer, the term of this patent is extended or adjusted under 35 U.S.C. 154(b) by 0 days.

(21) Appl. No.: 12/419,168

(22) Filed: Apr. 6, 2009

(65) Prior Publication Data

US 2009/0250899 A1    Oct. 8, 2009

Related U.S. Application Data

(60) Provisional application No. 61/042,287, filed on Apr. 4, 2008.

(51) Int. Cl.
*B62H 7/00* (2006.01)
(52) U.S. Cl. ........ 280/293; 280/767; 280/219; 280/296; 280/295; 280/124.13; 280/755; 280/763.1
(58) Field of Classification Search .................. 280/293, 280/767, 219, 296, 295, 124.13, 755, 763.1
See application file for complete search history.

(56) References Cited

U.S. PATENT DOCUMENTS

| | | | |
|---|---|---|---|
| 1,006,804 A | 10/1911 | Swanson | |
| 1,227,635 A | 5/1917 | Lake | |
| 1,315,048 A | 9/1919 | Stark | |
| 2,835,499 A | 5/1958 | Andren et al. | |
| 3,602,528 A | 8/1971 | Kelly | |
| 3,767,000 A * | 10/1973 | Smith | 180/16 |
| 4,133,402 A | 1/1979 | Soo Hoo | |
| 4,203,500 A | 5/1980 | Kamiya | |
| 4,313,511 A * | 2/1982 | Soo Hoo | 180/21 |
| 4,638,880 A | 1/1987 | Togashi | |
| 4,826,194 A | 5/1989 | Sakita | |
| 4,961,477 A * | 10/1990 | Sweeney | 180/219 |
| 5,029,894 A | 7/1991 | Willman | |
| 5,911,427 A * | 6/1999 | Lenz, Jr. | 280/213 |
| 6,006,849 A * | 12/1999 | Watkins | 180/209 |
| 6,213,237 B1 | 4/2001 | Willman | |
| 6,296,266 B1 | 10/2001 | Martin | |
| 7,287,774 B2 | 10/2007 | Mullins | |
| 2003/0090097 A1* | 5/2003 | Ranc | 280/767 |
| 2004/0036253 A1* | 2/2004 | Cheng | 280/293 |
| 2005/0167961 A1* | 8/2005 | Murata et al. | 280/755 |
| 2005/0248140 A1* | 11/2005 | Wagner | 280/755 |
| 2006/0108159 A1 | 5/2006 | Jansson et al. | |
| 2006/0175109 A1* | 8/2006 | Cheng | 180/219 |
| 2008/0029994 A1* | 2/2008 | Lytle | 280/293 |

* cited by examiner

*Primary Examiner* — Paul N Dickson
*Assistant Examiner* — Marlon A Arce
(74) *Attorney, Agent, or Firm* — Hartman & Hartman, P.C.; Gary M. Hartman; Domenica N. S. Hartman

(57) ABSTRACT

A method and apparatus suitable for stabilizing a two-wheeled motorcycle during operation. The apparatus is securable to a location near the front of the motorcycle engine. At least one arm assembly extends in a rearward direction relative to the motorcycle and outboard of the motorcycle's engine and operator's seat. A wheel assembly is mounted at an rearward end of the arm assembly and includes a wheel engageable with a surface supporting the motorcycle. A biasing assembly biases the arm assembly to rotate upward an adjustable limited distance at which the wheel is not engaged with the support surface. The biasing assembly applies a biasing resistance to downward rotation of the arm assembly over the limited distance for engaging the wheel with the support surface, yet allows the arm assembly to rotate upward farther than the limited distance to a raised position.

20 Claims, 4 Drawing Sheets

METHOD AND APPARATUS FOR STABILIZING A MOTORCYCLE

CROSS REFERENCE TO RELATED APPLICATIONS

This application claims the benefit of U.S. Provisional Application No. 61/042,287, filed Apr. 4, 2008, which is related to U.S. Provisional Application No. 61/012,079, filed Dec. 7, 2007. The contents of these applications are incorporated herein by reference.

BACKGROUND OF THE INVENTION

The present invention generally relates to motorcycles, and more particularly to an accessory for motorcycles that enables a rider to stabilize the motorcycle during stops, starts and turns at low speeds. The invention is particularly well suited for use by novice motorcycle riders as a tool to learn how to keep a motorcycle balanced during stops and starts through feedback felt with the rider's feet and legs.

Various accessories have been proposed for stabilizing motorcycles during stops, starts and turns at low speeds. Typically, these accessories have had basic structural features in common, including stabilizing wheel assemblies that are pivotally mounted to either side of a motorcycle and operable with the rider's feet. Examples include U.S. Pat. No. 3,602,528 to Kelly, U.S. Pat. No. 4,826,194 to Sakita, and U.S. Pat. No. 7,287,774 to Mullins.

Kelly discloses a stabilizing device with castor wheels positioned in front and to either side of the rear wheel of a motorcycle. Each wheel is mounted to a forward-extending frame member pivotally coupled with a hinge to a transverse part of an inverted T-shaped frame member, which itself is pivotally attached beneath the motorcycle. The hinges enable the rider to simultaneously engage both wheels with the ground by pressing on platforms with his/her feet. The wheels pivot about an axis parallel to the longitudinal axis of the motorcycle.

Sakita also discloses a stabilizing device with wheels positioned in front and to either side of the rear wheel of a motorcycle. The wheels are mounted to arms that extend rearwardly on the motorcycle. The arms are interconnected by a shaft, so that they must rotate together. A lever is operated with a foot pad to lock the arms in position to support the motorcycle.

Similar to Kelly and Sakita, Mullins discloses a stabilizing device with wheels positioned in front and to either side of the rear wheel of a motorcycle. Mullins' wheels are mounted on a torsion assembly, which includes short arms that extend rearward.

BRIEF DESCRIPTION OF THE INVENTION

The present invention provides a method and apparatus suitable for stabilizing a two-wheeled motorcycle during operation. As used herein, two-wheeled motorcycles encompass motorized vehicles of essentially any size with no more than two-wheels, and consequently tend to be unstable when stopped or operating at low speeds.

According to a first aspect of the invention, the apparatus includes means for securing the apparatus at a location near the front of an engine of the motorcycle and positioning the apparatus outboard of the engine and outboard of an operator's seat of the motorcycle. At least one arm assembly is mounted to and oriented by the securing means so as to extend in a rearward direction relative to the motorcycle when secured by the securing means to the motorcycle. A wheel assembly is mounted at a rearward end of the arm assembly and comprises a wheel that is engageable with the surface supporting the motorcycle. A means is provided for biasing the arm assembly to rotate upward an adjustable limited distance at which the wheel is not engaged with the support surface. The biasing means also applies a biasing resistance to downward rotation of the arm assembly over the limited distance for engaging the wheel with the support surface, yet allows the arm assembly to rotate upward farther than the limited distance and to a raised position at which the arm assembly is retained.

According to a second aspect of the invention, the method for stabilizing a two-wheeled motorcycle during its operation includes securing the apparatus to a location near the front of an engine of the motorcycle. The apparatus has at least one arm assembly positioned outboard of the engine and outboard of an operator's seat of the motorcycle, and oriented so as to extend in a rearward direction relative to the motorcycle. If the apparatus is equipped with two of such arm assemblies, the assemblies are mounted on oppositely-disposed outboard sides of the engine. The apparatus further has a wheel assembly mounted at a rearward end of each arm assembly, with the wheel assembly comprising a wheel for engagement with the surface on which the motorcycle is operated. The arm assembly is biased to rotate upward an adjustable limited distance at which the wheel thereof is not engaged with the support surface. By applying a downward force to the arm assembly against a biasing resistance, the arm assembly is caused to rotate downward over the limited distance and engage its wheel with the surface supporting the motorcycle. The arm assembly can also be rotated upward farther than the limited distance to a raised position at which the arm assembly is retained. The apparatus is configured so that a motorcycle can be stabilized with a single arm assembly located on either outboard side of the motorcycle, or two arm assemblies located on both outboard sides of the motorcycle.

Various aspects and advantages of this invention will be better appreciated from the following detailed description.

DETAILED DESCRIPTION OF THE INVENTION

Figure 1:
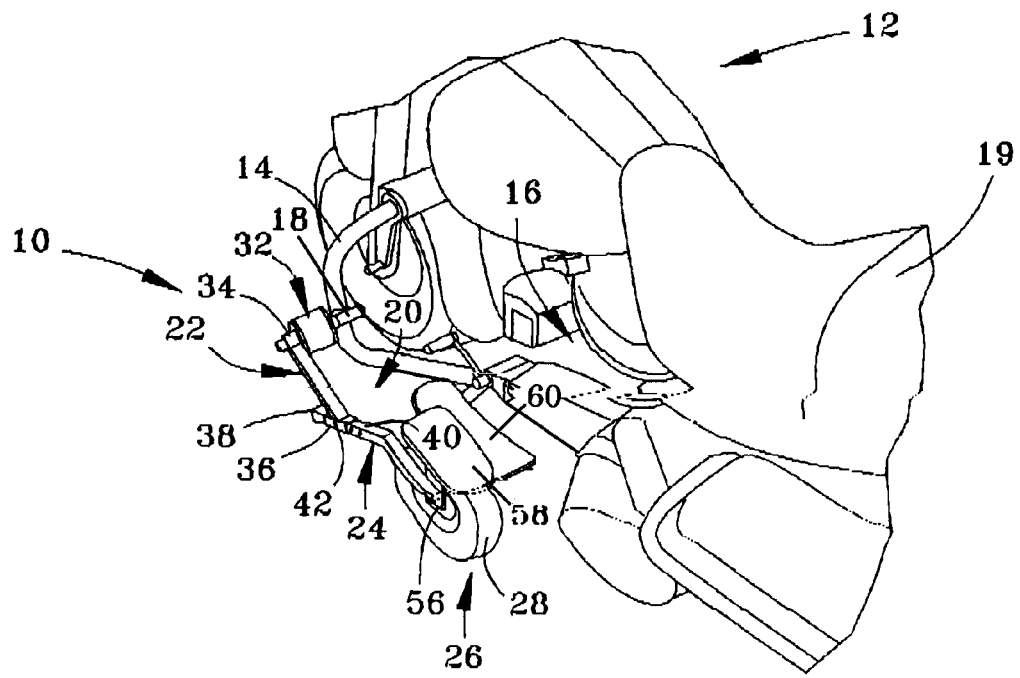
FIGS. 1 and 2 are perspective views representing a motorcycle equipped with a stabilizing apparatus in accordance with a first embodiment of this invention.

FIGS. 1 through 7 depict three configurations of stabilizing apparatuses 10, 100 and 200 suitable for use as accessories on motorcycles of various types and configurations. The apparatuses 10, 100 and 200 may be referred to as trike units, in that their use can provide a temporary stabilizing effect similar to the intended effect of a trike, or three-wheeled motorcycle. However, the apparatuses 10, 100 and 200 of this invention offer advantages over traditional trikes.

The apparatuses 10, 100 and 200 are adapted to mount near the front of a motorcycle 12 and extend rearwardly, which is believed to facilitate mounting and dismounting of the motorcycle 12 by the operator. However, an alternative arrangement is to mount the apparatus 10/100/200 rearwardly and have it extend in the forward direction. In the embodiments shown, the apparatuses 10, 100 and 200 are preferably adapted to be mounted to vertical, horizontal, or inclined tube sections of an engine guard (crash bar) 14 of the motorcycle 12, which is conventionally located in front of the motorcycle engine 16. A suitable securement feature 18 may be a weldment (as shown), or any other suitable means such as clamps, brackets, etc., that can be secured to or near the front of the engine 16. Preferred securement features 18 enable the entire apparatus 10/100/200 to be removed from the motorcycle 12 in a matter of seconds. From the engine guard 14, each apparatus 10/100 has at least one arm assembly 20/120,220 positioned outboard of the engine 16 and outboard of the operator's seat 19 on either the lefthand or righthand side of the motorcycle 12. In use, a single arm assembly 20/120/220 has been found to be sufficient as it provides a third wheel located roughly midway between the front and rear tires of the motorcycle that forms a three-point support base. However, in some situations a user may prefer to have an arm assembly 20/120/220 on both the lefthand and righthand side of the motorcycle 12 positioned outboard of the engine 16 and operator's seat 19, which permits the user to have a stabilizing four-wheel support base by simultaneously operating both assemblies 20/120/220 or have a stabilizing three-wheel support base by selectively operating either arm assembly 20/120/220.

Figure 6:
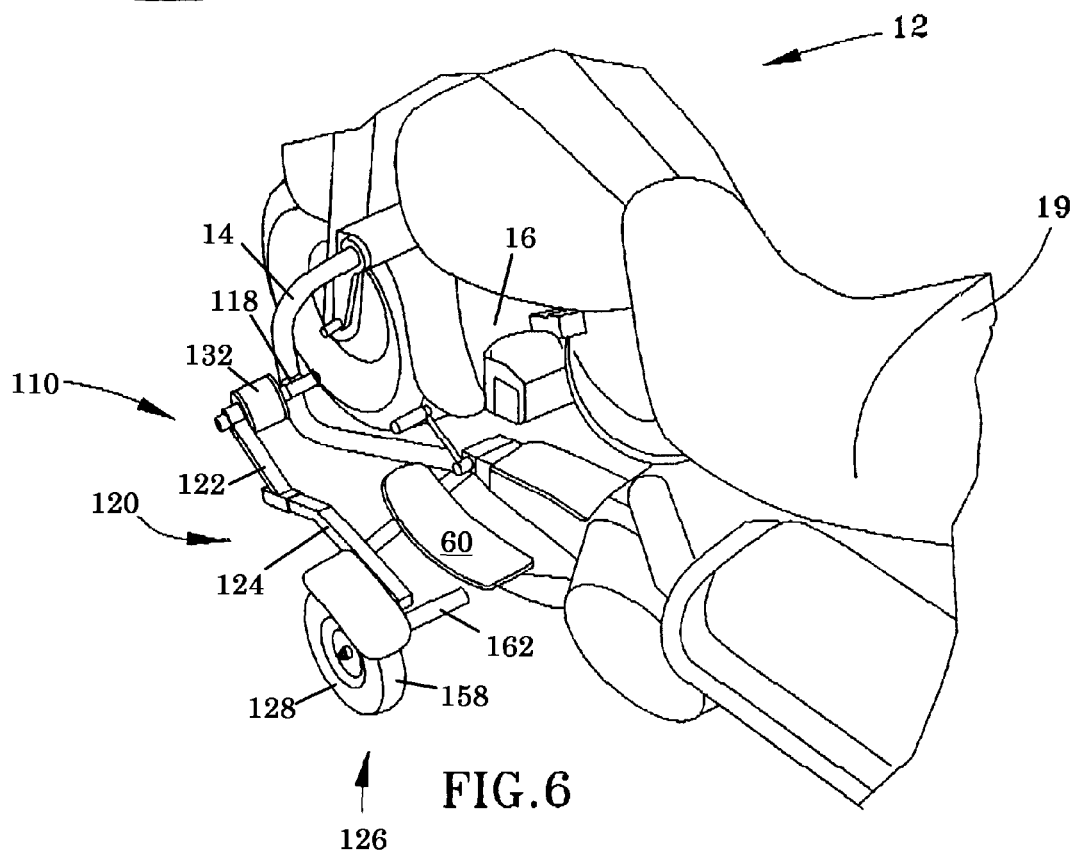
FIG. 6 is a perspective view representing a motorcycle equipped with a stabilizing apparatus in accordance with a second embodiment of this invention.
Figure 7:
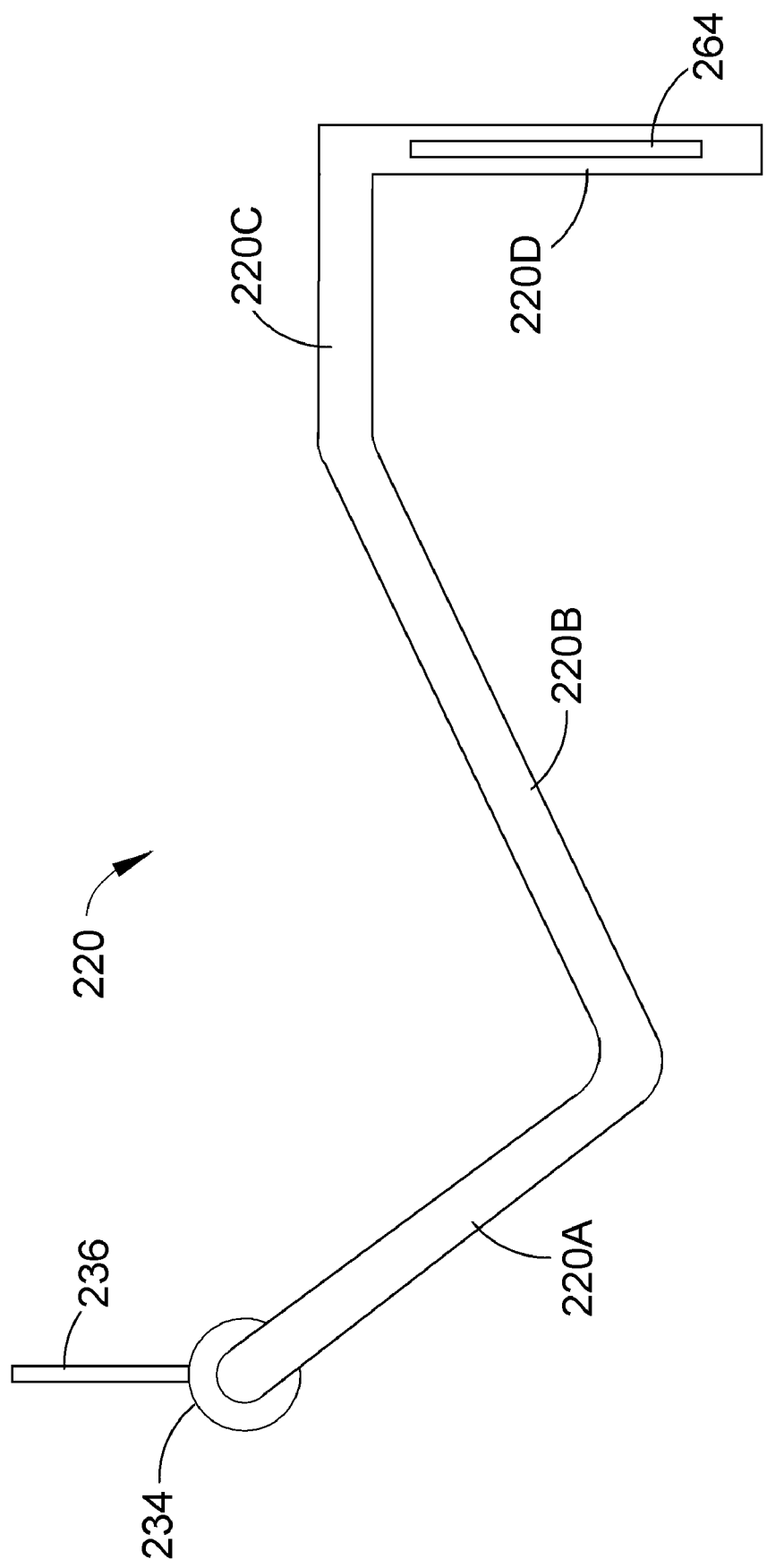
FIG. 7 is a side view showing an arm assembly of a stabilizing apparatus in accordance with a third embodiment of this invention.

In the figures, consistent reference numbers are used to identify functionally similar elements, but with a numerical prefix (1) or (2) added to distinguish the second and third embodiments of FIGS. 6 and 7 from the first embodiment of FIGS. 1 through 5.

Figure 2:
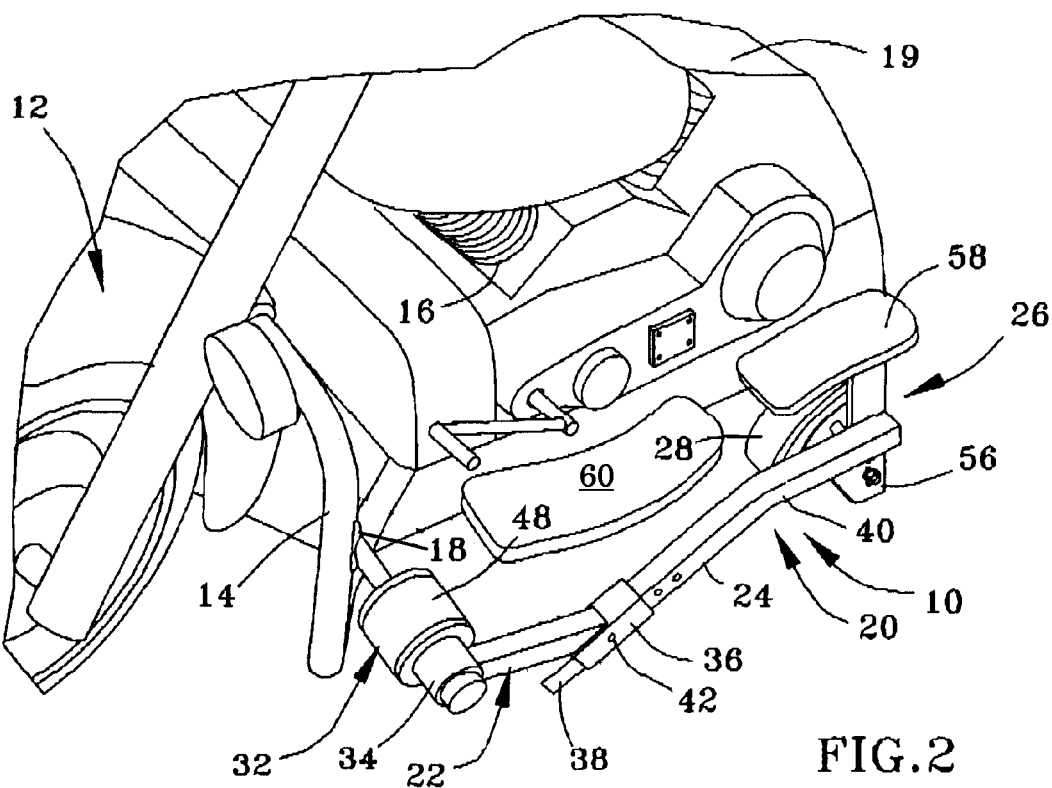

FIGS. 1 and 2 depict the arm assembly 20 of the stabilizing apparatus 10 of the first embodiment mounted on the lefthand side of the motorcycle 12. It should be understood that a righthand arm assembly (not shown) of the apparatus 10 would be essentially a mirror image of the assembly 20 shown in FIGS. 1 and 2. The arm assembly 20 is mounted to and oriented by the securement feature 18 so as to extend in a rearward direction relative to the motorcycle 12. The arm assembly 20 includes a first arm 22 that extends in a rearward direction relative to the motorcycle, and a second arm 24 that is adjustably coupled to the first arm 22, extends further in the rearward direction, and is adjustable relative to the first arm 22 so as to provide vertical adjustment and forward-rearward adjustment of the second arm 24 relative to the first arm 22 and, consequently, relative to the motorcycle 12. A wheel assembly 26 is mounted at a rearward end of the arm assembly 20 and comprises a wheel 28 that is engageable with the surface 30 (for example, a road surface) beneath and supporting the motorcycle 12.

The arm assembly 20 is biased to rotate upward by a biasing assembly 32 that interconnects the arm assembly 20 with the securement feature 18. The biasing assembly 32 functions to provide an adjustable limited distance D (FIG. 4) over which a biasing force is applied to the arm assembly 20 that tends to maintain the assembly 20 in the substantially horizontal orientation shown in FIGS. 1 and 2. The upper extent of the limited distance D provides that the wheel 28 is not engaged with the surface 30 during normal operation of the motorcycle 12. The biasing assembly 32 applies a biasing resistance to downward rotation of the arm assembly 20 over the limited distance D, the lower extent of which results in engagement of the wheel 28 with the surface 30. As will be discussed below, a notable feature of the biasing assembly 32 is that it allows the arm assembly 20 to rotate upward farther than the limited distance D, such that the assembly 20 can be rotated to a raised position shown in FIG. 5, at which the assembly 20 is retained by the biasing assembly 32. In this raised position, the motorcycle 12 can be more aggressively operated through sharp turns without engaging the wheel 28 with the surface 30. The biasing assembly 32 preferably exerts minimal if any resistance to upward rotation of the arm assembly 20 from the limited distance D, so that the arm assembly 20 will rotate upward during a sharp turn through contact of the wheel 28 with the surface 30 with minimal effect on the operation and stability of the motorcycle 12.

The first arm 22 comprises a collet or collar 34 adjacent the securement feature 18 and a rearward portion 36 adjacent the second arm 24. The second arm 24 comprises a forward portion 38 coupled to the first arm 22 and a rearward portion 40 adjacent the wheel assembly 26. For strength and weight considerations, both arms 22 and 24 may have a tubular cross-section, which as used herein encompasses round, square, or other cross-sections. The rearward portion 36 of the first arm 22 comprises a tubular or otherwise hollow section within which the forward portion 38 of the second arm 24 is adjustably received. When assembled, the rearward portion 36 of the first arm 22 and the forward portion 38 of the second arm 24 are preferably inclined to vertical such that movement of the forward portion 38 of the second arm 24 within the tubular section of the first arm 22 causes the second arm 24 to simultaneously move vertically and in a forward-rearward direction. In the embodiment shown in FIGS. 1 and 2, forward movement of the second arm 24 relative to the first arm 22 simultaneously causes the second arm 24 to move downward, and rearward movement of the second arm 24 relative to the first arm 22 simultaneously causes the second arm 24 to move upward, thus providing an upward-downward, forward-rearward adjustment capability to better match the stature of the operator. The arm assembly 20 is further shown as comprising a locking bolt 42 or other suitable feature for securing the forward portion 38 of the second arm 24 within the tubular section of the first arm 22.

Figure 3:
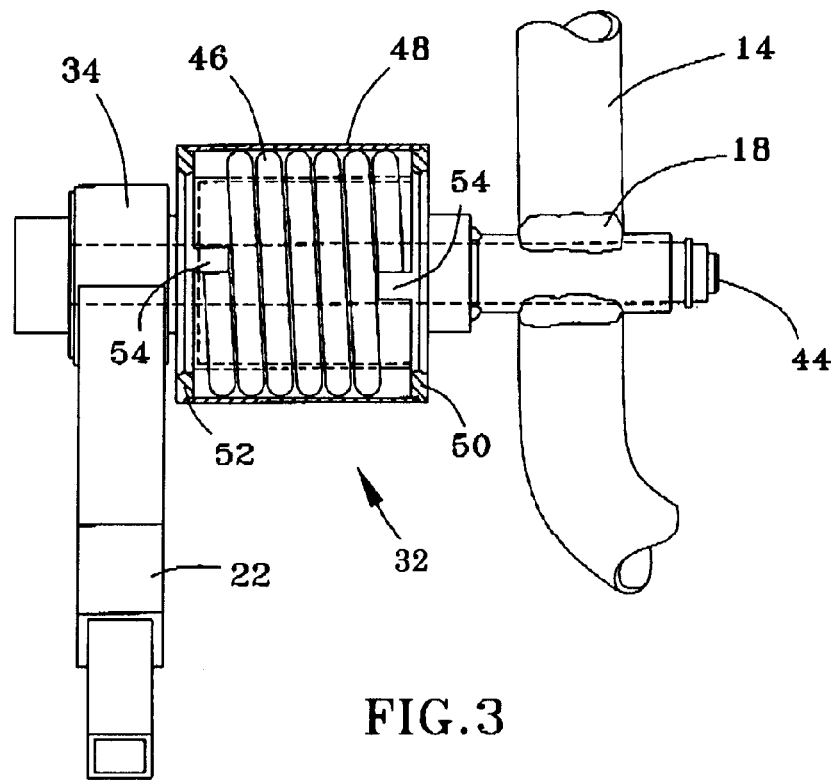
FIG. 3 is a detailed view of a biasing assembly of the stabilizing apparatus of FIGS. 1 and 2.

From FIGS. 2 and 3, the biasing assembly 32 can be seen as mounted to the securement feature 18. The assembly 32 includes a shaft or post 44 that has a roughly horizontal orientation transverse to the forward-rearward direction of the motorcycle 12, and extends in an outboard direction from the engine guard 14. As seen in FIG. 3, a helical torsion spring 46 is enclosed within a housing 48 and circumscribes the post 44. The collar 34 of the first arm 22 is mounted on the outboard end of the post 44. The post 44 is preferably (though not necessarily) configured to prevent its rotation relative to the engine guard, in which case the first arm 22 is preferably supported on the post 44 with bearings (not shown) to allow rotation of the first arm 22 about the axis of the post 44. The helical torsion spring 46 surrounds but does not necessarily contact the post 44, the inboard end of the spring 46 engages a stationary flange 50 that does not rotate as a result of the manner in which it is coupled to the post 44, and the outboard end of the spring 46 engages a flange 52 that forms a part of the collar 34 or is otherwise coupled to rotate with the arm assembly 20. The spring 46 is configured and mounted so that it radially expands (operate in an expansion mode) when the arm assembly 20 is rotated downward, thereby applying a biasing resistance to the downward rotation of the arm assembly 20 over the limited distance D. In the nonlimiting example shown, the spring 46 is configured to engage steps 54 formed on the flanges 50 and 52 when the wheel 28 is at the limited distance D above the surface 30. The spring 46 is preferably otherwise not attached to either flange 50 or 52 so that the spring 46 is able to freely rotate if the arm assembly 20 is rotated upward farther than the limited distance D. The limited distance D over which the biasing resistance is applied by the spring 46 can be adjusted by rotating the biasing assembly 32, effectively repositioning the angular positions of the flange steps 54 relative to the motorcycle 12 and its supporting surface 30.

Figure 4:
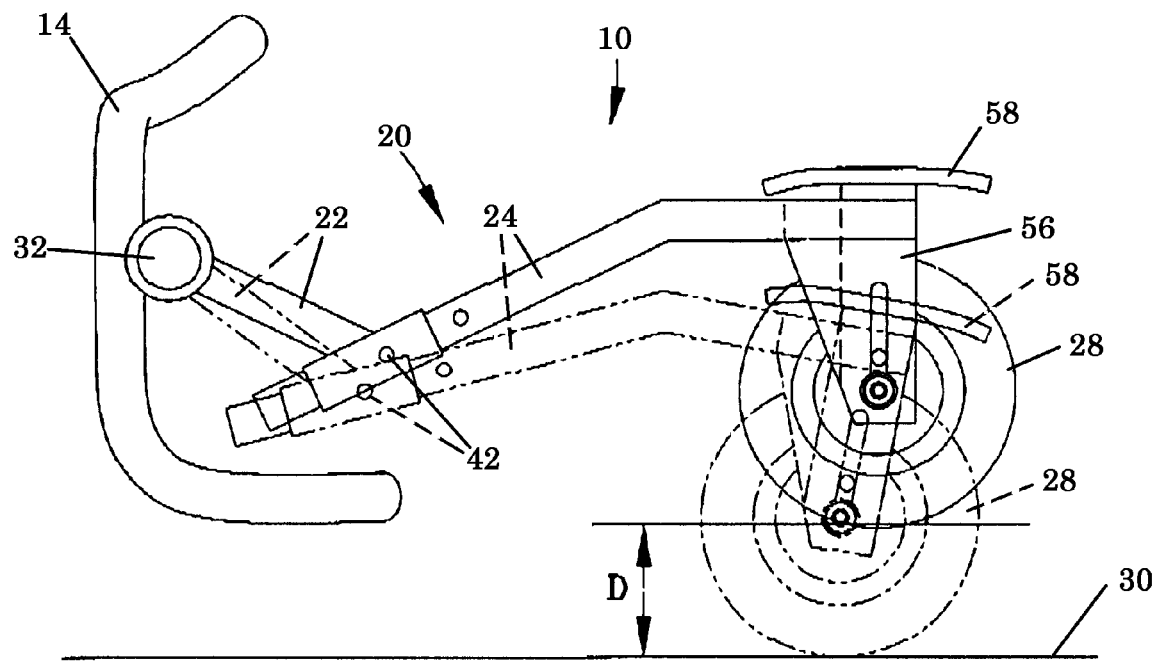
FIG. 4 illustrates the operation of the stabilizing apparatus, including a normal riding position for the apparatus, and an actuated position (in phantom) in which a wheel of the apparatus is engaged with the surface beneath the motorcycle to provide stability.
Figure 5:
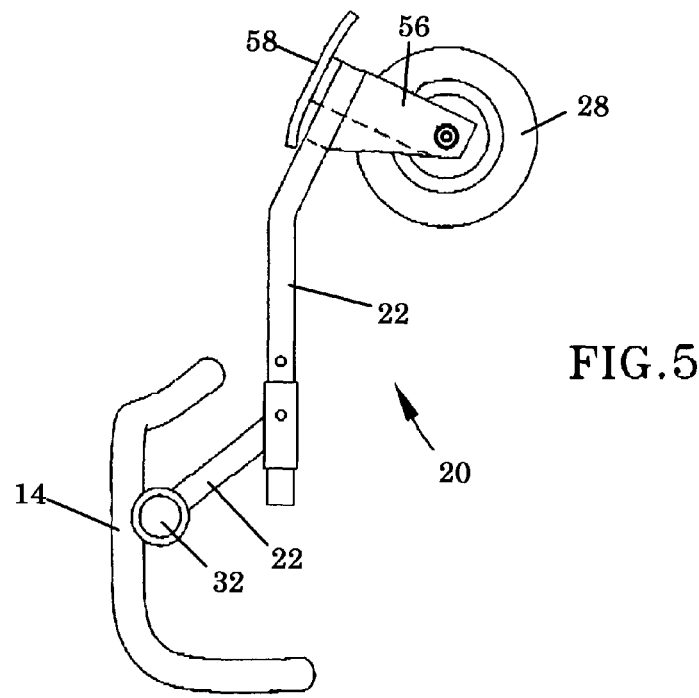
FIG. 5 illustrates the stabilizing apparatus in a raised or stowed position in which the apparatus is rotated upward from the normal riding position of FIG. 4.

The arrangement of the spring 46 described above provides for the aforementioned operation of the biasing assembly 32, including the application of the biasing force that resists downward travel of the arm assembly 20 through the limited distance D (FIG. 4) and maintains the assembly 20 in the substantially horizontal orientation shown in FIGS. 1 and 2, and the substantial absence of any biasing resistance (other than the weight of the arm assembly 20) to upward rotation of the assembly 20 beyond the limited distance D, such that the assembly 20 can be rotated to a raised position shown in FIG. 4. Another benefit of the expansion mode operation of the spring 46 is that the length of the spring 46 necessary to provide a desirable level of biasing resistance over the limited distance D is about one-third the length of a helical torsion spring operating in a contraction mode.

In the embodiment represented in FIGS. 1 through 5, the wheel 28 is shown mounted on a bracket 56 attached to the second arm 22, and located inboard of the arm assembly 20. Furthermore, the wheel 28 is covered by a foot-engageable plate 58 secured to the arm assembly 20 and disposed above the wheel 28. The plate 58 is preferably located immediately outboard of the operator foot peg 60 of the motorcycle 12, so that the motorcycle's operator is able to engage the wheel 28 with the surface 30 beneath the motorcycle 12 simply by moving his/her foot in the outboard direction and pushing downward on the plate 58.

In view of the preceding discussion, it should be apparent that the present invention provides an accessory that enables a rider to stabilize the motorcycle 12 during stops, starts and turns at low speeds by forcing the wheel 28 on either side of the motorcycle 12 into engagement with the surface 30 on which the motorcycle 12 is traveling or stopped. The invention is particularly well suited for use by novice riders as a tool to learn how to keep the motorcycle 12 balanced during stops and starts through feedback felt with the rider's feet and legs.

The embodiment of FIG. 6 primarily differs from the embodiment of FIGS. 1 through 5 by the configuration of its wheel assembly 126. In particular, the wheel 128 is mounted on a bracket (not shown) so as to be disposed outboard of the arm assembly 120. Furthermore, the wheel assembly 126 comprises a foot-engageable peg 162 disposed inboard of the wheel 128 and preferably immediately outboard of the operator foot peg 60 of the motorcycle 12, by which the motorcycle's operator can engage the wheel 128 with the surface 30 beneath the motorcycle 12.

The embodiment of FIG. 7 primarily differs from the embodiments of FIGS. 1 through 6 as a result of its arm assembly 220 having a one-piece construction. In particular, the arm assembly 220 is formed by a continuous tube section (round, square, or otherwise) from the collar 234 to the wheel assembly (not shown). The configuration of the arm assembly 220 is specially adapted to eliminate or at least reduce the need or desire for the adjustment capability of the first two embodiments. For this reason, the arm assembly 220 is shown to have a first section 220A, a second section 220B oriented roughly fifty-five degrees from the axis of the first section 220A, a third section 220C oriented roughly twenty degrees from the axis of the second section 220B, and a fourth section 220D oriented roughly ninety degrees from the axis of the third section 220C to define the wheel mounting bracket 256. When installed on a motorcycle, the third section 220C is preferably oriented to be roughly horizontal, for example, within about ten degrees or so of horizontal. The wheel mounting bracket 256 is represented as having a slot 264 that allows for vertical adjustment of the wheel 228 relative to the arm assembly 220. As with the previous embodiments, a foot-engageable plate (not shown) can be secured to the arm assembly 220, and particularly to the third section 220C so as to be disposed above the wheel (not shown), and a foot-engageable peg (not shown) can be provided inboard of the wheel mounting bracket 256 by which the rider can engage the wheel with the surface beneath the motorcycle. The collar 234 may be equipped with an upstanding lever 236 that can be operated with the rider's foot to rotate the assembly 220 upward beyond the limited distance D, to which the arm assembly 220 freely rotates in accordance with the previous embodiments.

While the invention has been described in terms of specific embodiments, it is apparent that other forms could be adopted by one skilled in the art. For example, the functions of each component of the apparatus 10, 100 and 200 could be performed by components of different construction but capable of a similar (though not necessarily equivalent) function, and the apparatus 10, 100 and 200 could differ in appearance and construction from the embodiment shown in the Figures, and various materials could be used. Therefore, the scope of the invention is to be limited only by the following claims.

The invention claimed is:

1. An apparatus for stabilizing a two-wheeled motorcycle during operation of the motorcycle on a support surface, the apparatus comprising:

means for securing the apparatus at a location near the front of an engine of the motorcycle and positioning the apparatus outboard of the engine and outboard of an operator's seat of the motorcycle;

an arm assembly mounted to and oriented by the securing means so as to extend in a rearward direction relative to the motorcycle when secured by the securing means to the motorcycle;

a wheel assembly mounted at an rearward end of the arm assembly, the wheel assembly comprising a wheel that is engageable with the support surface of the motorcycle; and means for biasing the arm assembly to rotate upward an adjustable limited distance at which the wheel is not engaged with the support surface, the biasing means applying a biasing resistance to downward rotation of the arm assembly over the limited distance for engaging the wheel with the support surface, the biasing means allowing the arm assembly to rotate upward farther than the limited distance and to a raised position at which the arm assembly is retained by the biasing means, wherein the first arm assembly is rotatable upward to the raised position without resistance from the biasing means.

2. The apparatus according to claim 1, wherein the arm assembly comprises:

a first arm oriented by the securing means so as to extend in the rearward direction of the motorcycle when secured by the securing means to the motorcycle; and a second arm adjustably coupled to the first arm, the second arm extending in the rearward direction and being adjustable relative to the first arm so as to provide vertical adjustment and forward-rearward adjustment of the second arm relative to the first arm and relative to the motorcycle;

wherein the wheel assembly is mounted at an rearward end of the second arm.

3. The apparatus according to claim 2, wherein the first arm comprises a first portion adjacent the securing means and a second portion adjacent the second arm, the second arm comprises a first portion adjacent the first arm and a second portion adjacent the wheel assembly, and the second portion of the first arm comprises a tube within which the first portion of the second arm is received.

4. The apparatus according to claim 3, wherein the first portion of the second arm is adjustably received in the tube of the first arm, and the arm assembly further comprises means for securing the first portion of the second arm within the tube of the first arm.

5. The apparatus according to claim 3, wherein the tube of the first arm and the first portion of the second arm are inclined to vertical such that movement of the first portion of the second arm within the tube of the first arm causes the second arm to simultaneously move either upward and rearward or downward and forward.

6. The apparatus according to claim 1, wherein the biasing means is mounted to the securing means and the limited distance over which the biasing resistance is applied by the biasing means is adjustable by rotating the biasing means.

7. The apparatus according to claim 1, wherein the biasing means comprises a post and a helical torsion spring circumscribing the post.

8. The apparatus according to claim 7, wherein the helical torsion spring is radially expanded to apply the biasing resistance to downward rotation of the arm assembly over the limited distance.

9. The apparatus according to claim 7, wherein the helical torsion spring slips on the post when the arm assembly is rotated upward farther than the limited distance.

10. The apparatus according to claim 1, wherein the securing means comprises an engine guard of the motorcycle.

11. The apparatus according to claim 1, further comprising a foot-engageable plate secured to the arm assembly and disposed above the wheel.

12. The apparatus according to claim 1, further comprising a foot-engageable peg secured to the arm assembly and disposed inboard of the wheel.

13. The apparatus according to claim 1, wherein the apparatus has only one of the arm assembly for mounting on one of the outboard sides of the motorcycle.

14. The apparatus according to claim 1, wherein the arm assembly is a first arm assembly of the apparatus and the apparatus has a second arm assembly adapted and configured to be mounted on an outboard side of the motorcycle opposite the first arm assembly, the second arm assembly is oriented so as to extend in the rearward direction relative to the motorcycle and has a wheel assembly mounted at an rearward end thereof comprising a wheel for engagement with the support surface, and the first and second arm assemblies rotate independently of each other when either is rotated upward the adjustable limited distance, rotated downward over the limited distance, and rotated upward farther than the limited distance to the raised position.

15. The apparatus according to claim 1, wherein the apparatus is mounted to the motorcycle, the motorcycle comprises operator foot pegs, and the wheel assembly of the apparatus is disposed immediately outboard of the operator foot pegs.

16. An apparatus for stabilizing a two-wheeled motorcycle during operation of the motorcycle on a support surface, the apparatus comprising:

means for securing the apparatus at a location near the front of an engine of the motorcycle;

first and second arm assemblies configured to be oppositely-disposed outboard of the engine and outboard of an operator's seat of the motorcycle when the apparatus is secured by the securing means to the motorcycle, each of the first and second arm assemblies comprising a first arm that extends in a rearward direction relative to the motorcycle when the apparatus is secured by the securing means to the motorcycle, and a second arm adjustably coupled to the first arm, extending in the rearward direction and adjustable relative to the first arm so as to provide vertical adjustment and forward-rearward adjustment of the second arm relative to the first arm;

wheel assemblies mounted at rearward ends of the second arms of the arm assemblies, each of the wheel assemblies comprising a wheel that is engageable with the support surface of the motorcycle; and means for biasing each of the arm assemblies to rotate upward an adjustable limited distance at which the second arm thereof is approximately horizontal and the wheel thereof is not engaged with the support surface, the biasing means comprising posts mounted to the securing means and helical torsion springs circumscribing the posts, each of the helical torsion springs being adapted to be radially expanded to apply a biasing resistance to downward rotation of the arm assembly thereof over the limited distance to engage the wheel thereof with the support surface, and being adapted to slip on the post thereof when the arm assembly thereof is rotated upward farther than the limited distance to a raised position at which the arm assembly thereof is retained by the biasing means.

17. The apparatus according to claim 16, wherein each of the first arms comprises a first portion adjacent the securing means and a second portion adjacent the second arm, each of the second arms comprises a first portion adjacent the first arm thereof and a second portion adjacent the wheel assembly, each of the second portions of the first arms comprises a tube within which the first portion of the second arm thereof is adjustably received.

18. The apparatus according to claim 17, wherein the tubes of the first arms and the first portions of the second arms are inclined to vertical such that movement of one of the first portions of the second arms within the tube thereof causes the second arm to simultaneously move either upward and rearward or downward and forward.

19. The apparatus according to claim 16, wherein the apparatus is secured with the securing means to an engine guard of the motorcycle, the motorcycle comprises operator foot pegs, and the wheel assembly of the apparatus is disposed immediately outboard of the operator foot pegs.

20. A method of operating a stabilizing apparatus of a two-wheeled motorcycle operating on a support surface, the method comprising:

securing the apparatus to a location near the front of an engine of the motorcycle and positioning the apparatus outboard of the engine and outboard of an operator's seat of the motorcycle, the apparatus having at least a first arm assembly mounted on an outboard side of the engine and a second arm assembly adapted and configured to be mounted on an outboard side of the motorcycle opposite the first arm assembly, each of the first and second arm assemblies being oriented so as to extend in a rearward direction relative to the motorcycle, the apparatus further having a wheel assembly mounted at an rearward end of each of the first and second arm assemblies, each of the wheel assemblies comprising a wheel for engagement with the support surface on which the motorcycle is operating;

biasing the first and second arm assemblies to rotate upward independently of each other an adjustable limited distance at which the wheels thereof are not engaged with the support surface;

applying a downward force to the first arm assembly against a biasing resistance to cause downward rotation of the first arm assembly over the limited distance independently of the second arm assembly and engage the wheel thereof with the support surface independently of the second arm assembly; and rotating the first arm assembly upward farther than the limited distance to a raised position at which the first arm assembly is retained, wherein the first arm assembly is rotated upward to the raised position independently of the second arm assembly and without bias resistance thereto.

\* \* \* \* \*